United States Patent [19]
Schuppler et al.

[11] Patent Number: 5,510,069
[45] Date of Patent: Apr. 23, 1996

[54] PROCESS FOR PRODUCTION OF A FLAT GASKET MATERIAL

[75] Inventors: Wolfgang Schuppler, Dornstadt; Michael Sroka, Elchingen; Fritz Ebersberger, Neu-Ulm-Reutti; Kurt Österle, Munderkingen, all of Germany

[73] Assignee: Reinz-Dichtungs-Gellschaft mbH, Germany

[21] Appl. No.: 99,332

[22] Filed: Aug. 2, 1993

[30] Foreign Application Priority Data

Jul. 31, 1992 [DE] Germany .................. 42 25 379.9

[51] Int. Cl.⁶ .................................................. B05D 1/28
[52] U.S. Cl. ............... 264/132; 101/170; 156/307.7; 264/153; 277/211; 277/235 B; 427/210; 427/211
[58] Field of Search ................. 427/211, 210, 427/278, 287; 101/170, 220, 221; 277/207 R, 211, 227, 235 R, 235 B; 264/132, 153, 259, 265; 156/277, 307.7, 269

[56] References Cited

U.S. PATENT DOCUMENTS

| | | | |
|---|---|---|---|
| 3,198,111 | 8/1965 | Ellis et al. | 101/170 |
| 3,737,169 | 6/1973 | Glynn | 264/259 |
| 3,922,391 | 11/1975 | Qualtrough et al. | 427/211 |
| 4,116,124 | 9/1978 | Farrow et al. | 101/170 |
| 4,566,384 | 1/1986 | Matsumoto | 101/170 |
| 4,861,047 | 8/1989 | Okano | 277/235 B |
| 4,880,669 | 11/1989 | Dorn et al. | 427/210 |
| 5,271,144 | 12/1993 | Barker | 427/210 |

FOREIGN PATENT DOCUMENTS

| | | | |
|---|---|---|---|
| 717894 | 9/1965 | Canada | 264/153 |
| 3439602 | 7/1986 | Germany . | |
| 3543839 | 6/1987 | Germany . | |
| 3724515 | 2/1989 | Germany . | |
| 3802090 | 3/1989 | Germany . | |
| 969700 | 9/1964 | United Kingdom | 277/211 |
| 1351084 | 4/1974 | United Kingdom | 427/211 |

*Primary Examiner*—Robert B. Davis
*Attorney, Agent, or Firm*—Sixbey, Friedman Leedom & Ferguson; David S. Safran

[57] ABSTRACT

The invention relates to a flat gasket material and to a process for the production thereof and of a flat gasket therefrom. In the process according to the invention the flat gasket material is preferably constituted by an indeterminate length sheet or web of a carrier material, which is printed on one or two sides with a sealing layer. The finished printed sheet or web of indeterminate length is subsequently punched out to the desired flat gasket shape. The sealing layer is a geometrical structure that is the same on both sides of the sheet and congruent.

13 Claims, 3 Drawing Sheets

PROCESS FOR PRODUCTION OF A FLAT GASKET MATERIAL

BACKGROUND OF THE INVENTION

1. Field of the Invention

The invention relates to a flat gasket material formed of a sheet or web of indeterminate length of a carrier material printed on both sides with a sealing layer of predetermined geometrical structure and to a process for producing such a flat gasket material from a carrier material of indeterminate length.

2. Description of Related Art

In sealing technology, use is frequently made of gaskets, which comprise a carrier material, to which are applied sealing beads by means of a screen printing process. If it is necessary to have a two-sided coating of the carrier material with sealing beads, then both gasket sides must be individually and successively printed. This printing process is very time-consuming and therefore cost-intensive. In cases where specific sealing bead geometries are required on the carrier, there is no choice but to use this process. Of late, increasing significance has been attached to gaskets requiring no specific geometrical structures, but which are instead provided in full-surface manner with a sealing structure, e.g. a reticular, honeycomb or latticed structure. Such a structure is described in German patent application DE 37 24 5 15 A1, where each side of the gasket has to be individually printed.

The carrier material is formed from metallic or non-metallic materials onto which are pressed soft to hard, plastic or elastic polymeric masses, which are suitable for sealing two surfaces which are substantially static with respect to one another.

SUMMARY OF THE INVENTION

The primary object of the present invention is the provision of a flat gasket material of the aforementioned type, which can be inexpensively manufactured, while also providing a process for the production of said flat gasket material.

This object is achieved by a flat gasket material wherein the geometrical sealing structure is the same on both sides of the carrier and is congruent and a process for producing such a flat gasket material wherein the sealing layer is applied to the carrier material in a rotary printing process. According to the invention the flat gasket material is constituted by a carrier material printed on one or two sides and which, as a product sold by the length, i.e., per meter, is manufactured as an sheet or web of indeterminate length. Randomly shaped gaskets are punched from this flat gasket material for the production of the flat gasket.

Instead of using a sheet or web of indeterminate length it is also possible to use separate large portions of sheet or web, from which can be punched several gaskets having a random shape.

In the flat gasket production process according to the invention, the metallic or non-metallic carrier material is provided as a semi-manufactured article with a sealing layer on one or both sides, and subsequently, the outer and inner contours of the flat gasket are punched out.

Preferably, the carrier material is constituted by a sheet or web of indeterminate length that is continuously coated by rotary printing process. The process is particularly suitable for producing sealing layers, which are applied in a full-surface manner to the carrier material.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

The flat gasket material 10 of the present invention is produced as a semi-manufactured (intermediate product) article in which a carrier material 12 has a sealing layer 14 in the form of a geometrical structure on its surface. The flat gasket material according to the invention is particularly suitable for flat gaskets, which are printed in a full-surface manner with a uniform geometrically-shape structure of sealing layer 14. While it is possible to use a metallic or non-metallic material with absorptive or nonabsorptive properties as the carrier material 12, the sealing layer 14 is preferably made from polyurethane, silicone, nitrile robber, fluorinated rubber, epoxy resin or phenolic resin, applied to the carrier material by a screen printing or rotary printing process.

Figure 1:
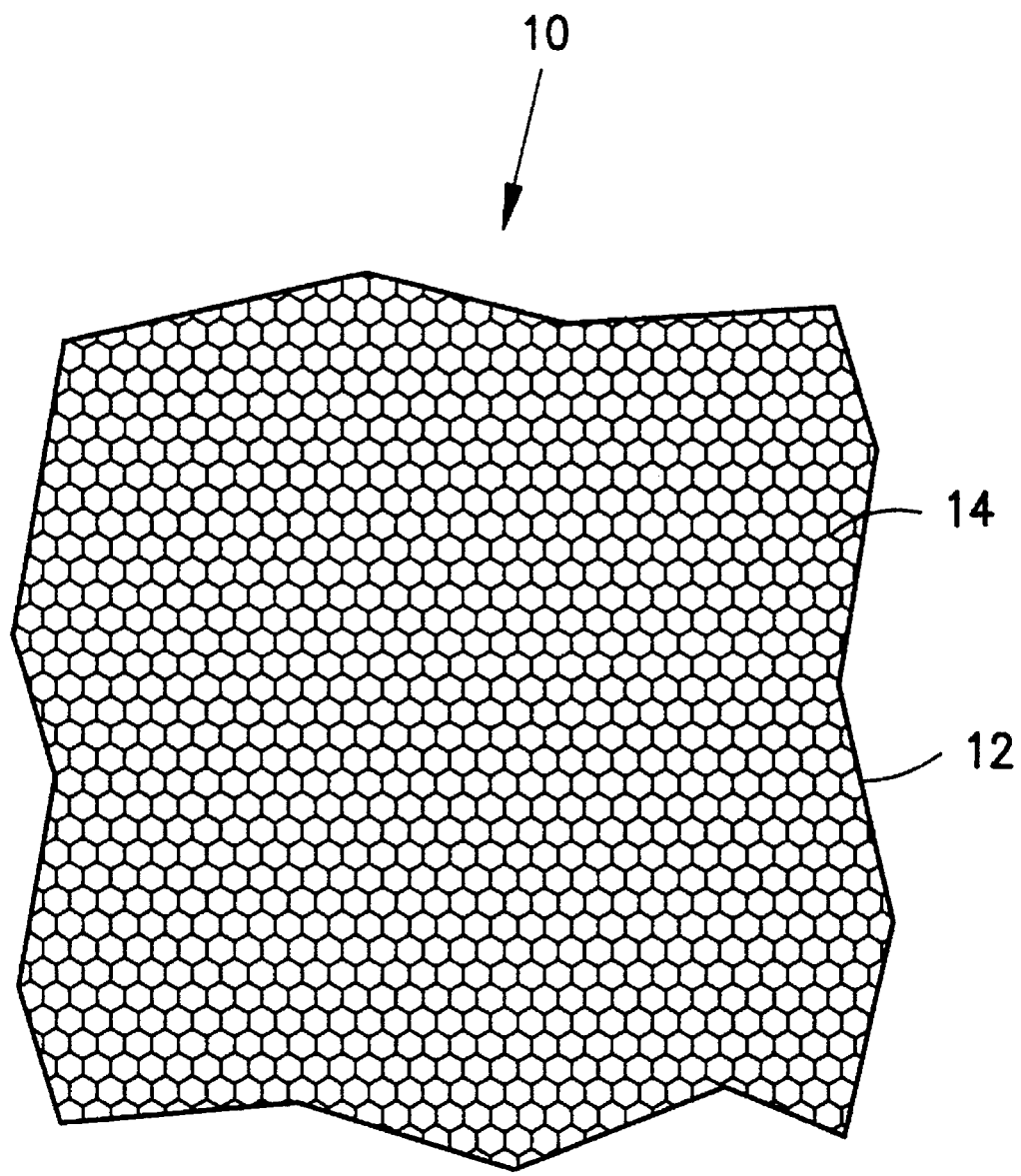
FIG. 1 is a plan view of a surface detail of a first flat gasket material with a hexagonal pattern or grid, roughly in actual size.

The geometric shape of the structure of the sealing layer can consist of circles, squares, diamonds, rectangles, pentagons, hexagons or combinations thereof, and the individual geometric shapes can be interconnected in a continuous manner or can be provided in isolated form. An example of the geometrical structure of the sealing layer 14 is shown in FIG. 1 as being a honeycomb pattern. Sealing layer 14 is completely crosslinked in a flat manner so as to ensure a high sealing action, which is independent of the shape of a through opening punched into the flat gasket material 10. Therefore, the material 10 can be used for random gasket shapes. From the flat gasket material 10, which as a product sold by the meter, e.g. in the form of a web or sheet portion, it is possible to manufacture gasket shapes of the most varied types, so that the number of semi-manufactured articles kept in stock can be significantly reduced.

Figure 2:
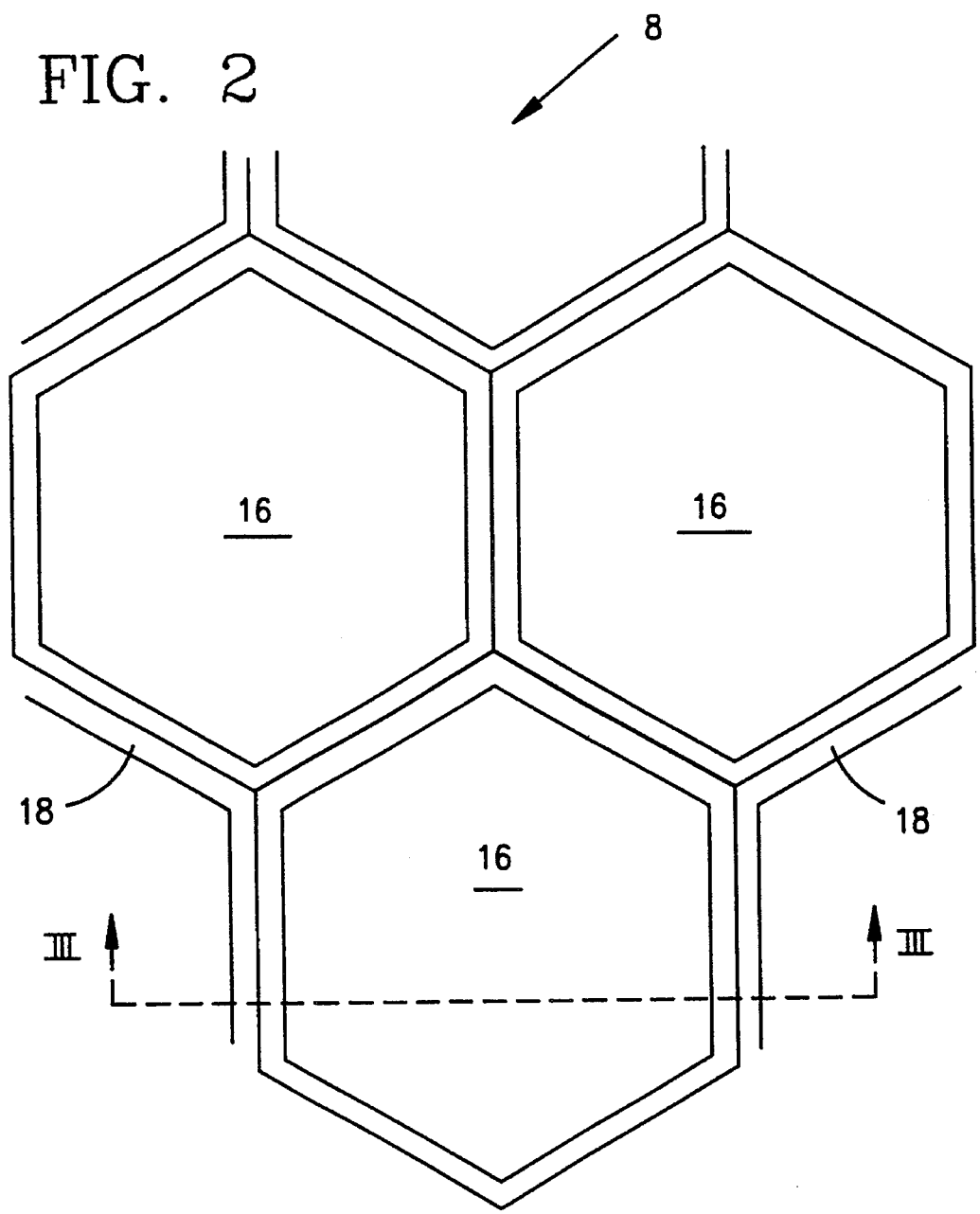
FIG. 2 is an enlarged plan view of the surface of a printing roller for production of the flat gasket material according to FIG. 1.
Figure 3:
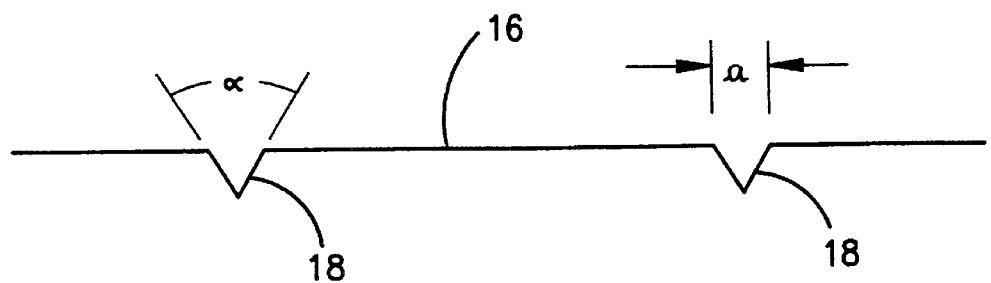
FIG. 3 is a cross section through the roller surface taken along section line III–III in FIG. 2.

A grid or pattern of geometric shape, such as that of FIG. 1, can be produced by means of a printing roller 8, whose circumferential surface is shown in detail plan view in FIG. 2 and in cross section in FIG. 3. From the enlarged representations of FIGS. 2 and 3, it is clear that hexagonal, planar surfaces 16 are separated from one another by punched in depressions 18, which receive an unillustrated screen printing material. In the represented embodiment the depressions 18 have a triangular cross-section with a base a and an angular aperture $\propto$. Typically, the angular aperture $\propto$ is 80° and the base a is approximately 500 μm wide in the case of a depth of the depressions 18 of approximately 200 m. Parallel depressions 18 have a spacing of approximately 2 mm in such a case. The thickness of the printed-on structures produced by the roller surface are, generally, between 0.01 and 2.5 mm, preferably between 0.05 and 1.75 mm.

Figure 4:
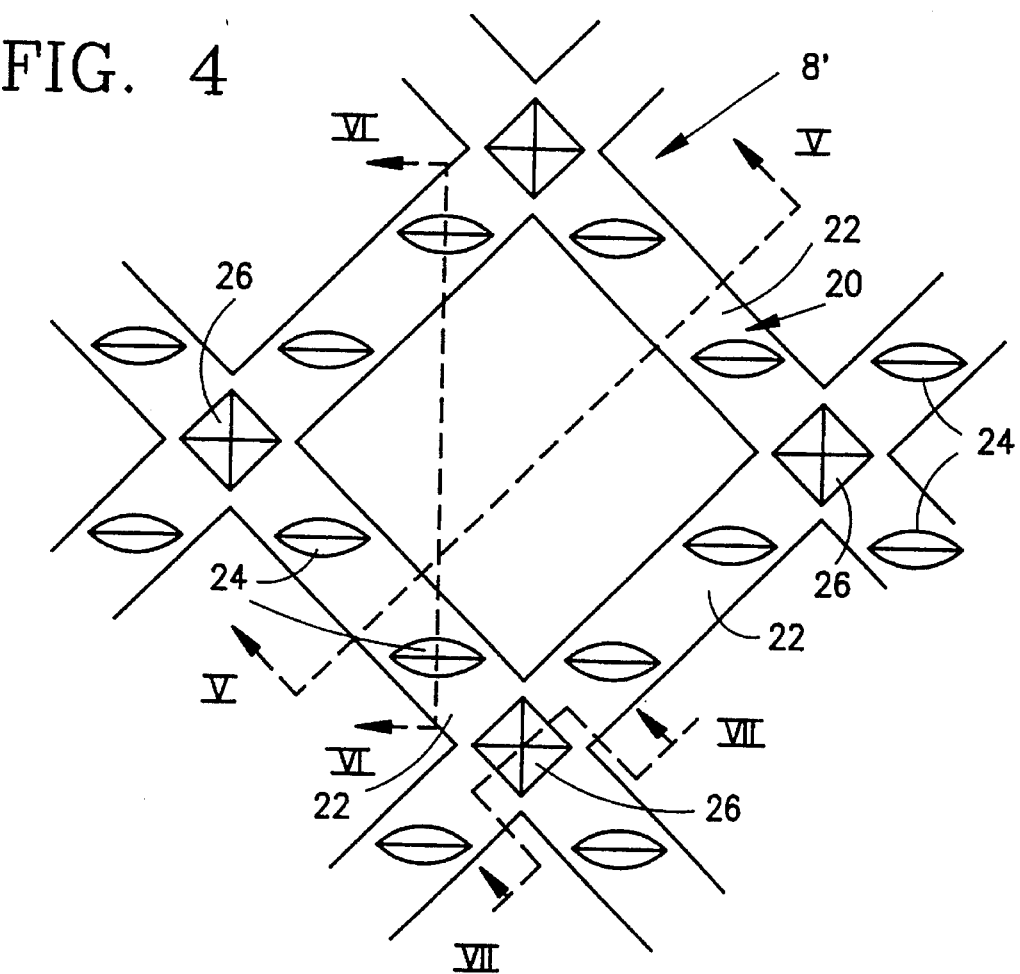
FIG. 4 is a plan view of an enlarged surface detail of a further printing roller with a tetragonal grid or pattern.
Figure 5:
FIGS. 5–7, in each case, is a cross section through the roller surface along the section lines V–V, VI–VI and VII–VII, respectively, in FIG. 4.
Figure 6:
Figure 7:
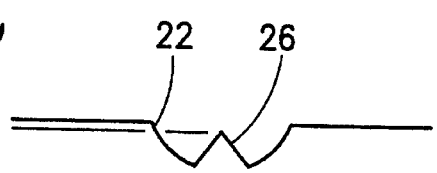

The embodiment of FIG. 4 illustrates, in plan view, a surface of another printing roller, 8', which has a diagonal groove pattern 20 formed from depressions 22 with a semicircular cross section (FIG. 5). These depressions 22 are provided with transverse ribs 24, which can be shaped in such a way that during the printing process they ensure a uniform application of the pattern of sealing material by the printing roller 8' to the carrier material. The transverse ribs 24 are oriented at an angle of approximately 45° to the longitudinal direction of the depressions 22, and according to FIG. 6, have a triangular cross-section, the apex terminating flush with the surface of the sealing layer 14. In each intersection of the depressions 22, there are pyramids 26, which are illustrated in cross section in FIG. 7.

For a one-sided printing, the carrier material is drawn between a smooth-surfaced pressing roller and a printing roller of a rotary printing plant. The printing roller surface contains an incorporated structure of the desired geometrical shape, which is to be transferred to the belt. Depressions in the printing roller are filled with the plastic and highly viscous mass of the sealing layer to be printed. This mass is transferred to one side of the belt during the printing process.

The printing process is followed by a drying or hardening process. Preferably, specifically developed printing rollers are used, which are provided with corresponding depressions, whose design permits a uniform application of the printing material and the transfer of the latter to the carrier material. This is, preferably, achieved by transverse ribs in the bottom of the depressions and/or by a precisely adapted depression shape and depth varying within a specific geometrical contour.

For two-sided printing, either the second side of the carrier material is printed in the same way as the first side between a printing roller and a pressing roller of the rotary printing plant, or alternatively, two printing rollers with an identical geometrical structure can be used, through which the carrier material is passed. Thus, in a process which is advantageous from time and cost Standpoints, the printing of both sides can take place in a single printing operation.

As printing masses or materials for the sealing layer, it is possible to use all polymeric materials which, as pasty masses, are produced in low molecular weight or dissolved form in a viscosity range of e.g. 10,000 to 500,000 mpa/s. Preferably, use is made of elastomers, such as nitrile rubber, fluorinated rubber, etc., thermoplastics, such as polyethylene, polypropylene, etc., or thermosetting plastics, such as epoxides. It is also possible to use foamed materials and mixtures of the various polymers, e.g. silicone/epoxide as the sealing layer. To improve the application characteristics of the sealing layer to the carrier material, the carrier material can be provided with a primer.

It is finally to be understood that although preferred embodiments of the present invention have been described, various other embodiments and variations may occur to those skilled in the art which fall within the scope and spirit of the invention, and such other embodiments and variations are intended to be covered by the following claims.

We claim:

1. A process for the production of a flat gasket material comprising the steps of:

obtaining an indeterminate length sheet or web of a carrier material; and printing a printing mass onto both sides of the indeterminate length sheet or web of the carrier material to form a continuously applied sealing layer in the form of a geometrical structure, the geometrical structure being the same and congruent on opposite sides of the carrier sheet, and being arranged independent of any gasket configuration of at least one flat gasket to be formed from said indeterminate length sheet or web of a carrier material.

2. A process according to claim 1, wherein said printing step is performed by a rotary printing process.

3. A process according to claim 1, wherein the printing mass is printed on so as to form the geometrical structure as a reticular or latticed structure.

4. A process according to claim 1, wherein the carrier material is provided with a primer prior to said printing step.

5. A process according to claim 2, wherein said rotary printing process is performed by passing the carrier material between two printing rollers for printing thereof with said printing mass on both sides.

6. A process according to claim 3, wherein the two printing rollers have an identical printing mass applying structure, and are synchronously rotated in such a way that the structures of both rollers are superimposed in a nip area through which the carrier material is passed.

7. A process according to claim 6, wherein the printing mass applying structure of each printing roller comprises depressions whose configuration provides a substantially uniform application of the printing mass to the carrier material.

8. A process according to claim 7, wherein the printing mass applying structure of each printing roller has transverse ribs in the bottom of the depressions.

9. A process according to claim 1, wherein the printing step is performed using a printing mass made of a material selected from the group consisting of silicone, polyurethane, nitrile rubber, fluorinated rubber, epoxy resin, and phenolic resin.

10. A process according to claim 1, wherein the printing step is performed so as to provide the sealing layer with a thickness of between 0.01 and 2.5 mm.

11. A process according to claim 10, wherein the printing step is performed so as to provide the sealing layer with a thickness of between 0.05 and 1.75 mm.

12. A process according to claim 1, wherein the printing step is performed so as to create the geometrical structure of the sealing layer as a pattern of geometric shapes selected from the group consisting of circles, squares, diamonds, rectangles, pentagons, hexagons, and combinations thereof.

13. A process for the production of a flat gasket from the flat gasket material comprising the steps of:

coating a printing mass onto both sides of an indeterminate length sheet or web of a carrier material to form a continuously applied sealing layer of geometrical structure, the geometrical structure being the same and congruent on opposite sides of the carrier sheet, and being arranged independent of any gasket configuration of at least one flat gasket to be formed from said indeterminate length sheet or web of carrier material; and subsequently, punching out said at least one flat gasket shape from the sheet or web independent of any specific alignment thereof with respect to said geometric structure.

\* \* \* \* \*